United States Patent
Rozenberg et al.

(10) Patent No.: US 10,155,671 B2
(45) Date of Patent: Dec. 18, 2018

(54) SYSTEM AND METHOD FOR CONTROLLING ULTRAVIOLET LIQUID DISINFECTION

(71) Applicant: Atlantium Technologies Ltd., Beit-Shemesh (IL)

(72) Inventors: Ytzhak Rozenberg, Ramat Gan (IL); Mike Kertser, Bnei Ayish (IL); Tovit Lichi, Gedera (IL); Zohar Vardiel, Or Yehuda (IL); Itay Kreisel, Shimshit (IL)

(73) Assignee: Atlantium Technologies Ltd, Beit-Shemesh (IL)

( * ) Notice: Subject to any disclaimer, the term of this patent is extended or adjusted under 35 U.S.C. 154(b) by 0 days.

(21) Appl. No.: 14/104,357

(22) Filed: Dec. 12, 2013

(65) Prior Publication Data
US 2014/0166590 A1   Jun. 19, 2014

Related U.S. Application Data

(60) Provisional application No. 61/736,860, filed on Dec. 13, 2012.

(51) Int. Cl.
*C02F 1/32* (2006.01)
*C02F 1/00* (2006.01)
(Continued)

(52) U.S. Cl.
CPC ............ *C02F 1/008* (2013.01); *C02F 1/32* (2013.01); *C02F 1/325* (2013.01); *B63J 4/002* (2013.01);
(Continued)

(58) Field of Classification Search
CPC .... C02F 1/30; C02F 1/32; C02F 1/325; C02F 2103/008; C02F 2103/08; C02F 2201/326;
(Continued)

(56) References Cited

U.S. PATENT DOCUMENTS 5,506,096 A * 4/1996 Helmo .................. C02F 3/006
                                              210/601
6,443,097 B1 * 9/2002 Zohar ...................... A01K 61/00
                                              119/215
(Continued)

FOREIGN PATENT DOCUMENTS

CN       102642960       8/2012
CN       202449881       9/2012
(Continued)

OTHER PUBLICATIONS

California State Lands Commision, "2010 Assessment of the Efficacy, Availability and Environmental Impacts of Ballast Water Treatment Systems for Use in California Waters", California State Legislature, Aug. 2010.
(Continued)

*Primary Examiner* — Heidi R Kelley
*Assistant Examiner* — Akash K Varma
(74) *Attorney, Agent, or Firm* — Pearl Cohen Zedek Latzer Baratz LLP (57) ABSTRACT

An ultraviolet (UV) liquid disinfection system and method are described. The system includes a conduit to carry liquid to be disinfected, the conduit having an inlet to receive the liquid and an outlet to discharge the liquid; a UV source configured to illuminate the liquid within the conduit; a liquid salinity detector to measure a value indicative of the liquid salinity; and a controller coupled to the salinity detector and configured to receive from the liquid salinity detector the measured value and to determine a desired salinity-adjusted UV dose level based on the measured value and predetermined data correlating salinity levels to respective UV dose levels.

15 Claims, 4 Drawing Sheets

(51) Int. Cl.
  *C02F 101/38* (2006.01)
  *C02F 103/00* (2006.01)
  *B63J 4/00* (2006.01)

(52) U.S. Cl.
  CPC .... *C02F 2101/38* (2013.01); *C02F 2103/008* (2013.01); *C02F 2201/326* (2013.01); *C02F 2201/3227* (2013.01); *C02F 2209/005* (2013.01); *C02F 2209/40* (2013.01); *C02F 2301/08* (2013.01); *C02F 2303/04* (2013.01)

(58) Field of Classification Search
  CPC .......... C02F 2209/001; C02F 2209/003; C02F 2209/005; C02F 2209/006; C02F 2209/05; C02F 2209/40; C02F 1/00; C02F 1/008; A61L 2/10
  USPC ....... 210/85, 96.1, 97, 143, 198.1, 739, 746, 210/748.11; 250/436, 372; 422/24, 108, 422/186.3
  See application file for complete search history.

(56) References Cited

U.S. PATENT DOCUMENTS

| | | | | |
|---|---|---|---|---|
| 2002/0117430 A1* | 8/2002 | Navarro et al. | ................. | 210/85 |
| 2005/0139530 A1* | 6/2005 | Heiss | ........................ | C02F 9/00 210/85 |
| 2005/0218082 A1* | 10/2005 | Williamson | ............ | A61L 9/205 210/739 |
| 2008/0190826 A1* | 8/2008 | Miner et al. | ..................... | 210/98 |
| 2008/0314807 A1* | 12/2008 | Junghanns | ........... | B01D 61/025 210/85 |
| 2010/0176056 A1* | 7/2010 | Rozenberg | ................ | A61L 2/10 210/636 |
| 2010/0206787 A1* | 8/2010 | Rozenberg et al. | ......... | 210/96.1 |

FOREIGN PATENT DOCUMENTS

| | | |
|---|---|---|
| JP | 2000 185280 | 7/2000 |
| JP | 2012 217966 | 11/2012 |

OTHER PUBLICATIONS

"Ultraviolet Disinfection Guidance Manual for the Final Long Term 2 Enhanced Surface Water Treatment Rule", Nov. 2006, EPA United States Environmental Protection Agency.

Lakretz et al. , "Biofouling control in water by various UVC wavelength and doses", Biofouling, vol. 26 No. 3, pp. 257-267, Apr. 2010, first published on Dec. 18, 2009.

Linden et al. , "Comparative effectiveness of UV wavelengths for the inacivation of *Cryptosporidium parvum* oocysts in water", Water Science and Technology, Feb. 2001, pp. 171-174, vol. 43, No. 12, IWA publishing.

Clifford M. Bray and Christopher E. West, "DNA repair mechanisms in plants: crucial sensors and effector for the maintenance of genome integrity", New Phytologist (2005) 168, pp. 511-528.

S. B. Agrawal, "Effects of Supplemental U.V.-B Radiation on Photosynthetic Pigment, Protein and Glutathione Contents in Green Algae", Environmental and Experimental Botany. Apr., 1992, pp. 137-144, vol. 32, No. 2.

Takayasu Hirosawa and Shigetoh Miyachi "Inactivation of Hill reaction by long-wavelength ultraviolet radiation (UV-A) and its photoreactivation by visible light in the cyanobacterium, *Anacystis nidulans*", Arch Microbiol Aug. 1983, vol. 135, pp. 98-102.

Michael J. Behrenfeldl, John W. Chapman, John T. Hardy, Henry Lee II, "Is there a common response to ultraviolet-B radiation by marine phytoplankton?", Marine Ecology Progress Serias, Dec. 9, 1993, vol. 102. pp. 59-68.

Fabien Joux, Wade H. Jeffrey, Philippe Lebaron, and David L. Mitchell "Marine Bacterial Isolates Display Diverse Responses to UV-B Radiation", Appl. Environ. Microbiol, 1999, 65(9), pp. 3820-3827, Sep. 1999.

* cited by examiner

SYSTEM AND METHOD FOR CONTROLLING ULTRAVIOLET LIQUID DISINFECTION

CROSS-REFERENCE TO RELATED APPLICATION

This application claims the benefit of US Provisional Patent Application No. 61/736,860, filed Dec. 13, 2012, which is hereby incorporated by reference.

BACKGROUND

Ultraviolet (UV) liquid disinfection systems, using UV light source have been long known. The degree of inactivation of microorganisms or absolute microbial level in the liquid is related to the UV dose applied to the microorganisms. The UV dose level is related to the UV light intensity and the exposure duration and is usually measured in units of miliJoules per square centimeter or alternatively as microwatt seconds per square centimeter ($\mu W \cdot s/cm^2$). UV disinfection systems may include a controlling and monitoring system to control and monitor the disinfection process.

Watercrafts or sea vessels may include a ballast water tank in order to provide stability to the watercraft. Ballast water are being pumped from the water surrounding the vessel and held in a tank located in the lower part of the vessel to weigh the vessel down and lower its center of gravity. The amount of ballast water may be adjusted during the voyage of the watercraft or during anchoring when the watercraft is loading or unloading cargo in order balance the watercraft. Discharging of ballast water taken from a first water region to a second water region may cause serious environmental problems. Ballast water discharge typically contains a variety of biological materials, including plants, animals, viruses, and bacteria including non-native, nuisance and exotic species that cause extensive ecological and economic damage to aquatic ecosystems.

International and national ballast water regulations require watercrafts to filter, disinfect and inactivate the biological materials in the ballast water prior to discharging the water. An example for such regulations is found in the Ballast Water Management set by the US Coast Guard Environmental standard division and the International Maritime Organization (IMO).

BRIEF DESCRIPTION OF THE DRAWINGS

The subject matter regarded as the invention is particularly pointed out and distinctly claimed in the concluding portion of the specification. The invention, however, both as to organization and method of operation, together with objects, features and advantages thereof, may best be understood by reference to the following detailed description when read with the accompanied drawings in which:

It will be appreciated that for simplicity and clarity of illustration, elements shown in the drawings have not necessarily been drawn accurately or to scale. For example, the dimensions of some of the elements may be exaggerated relative to other elements for clarity. Further, where considered appropriate, reference numerals may be repeated among the drawings to indicate corresponding or analogous elements. Moreover, some of the blocks depicted in the drawings may be combined into a single function.

DETAILED DESCRIPTION OF EMBODIMENTS OF THE INVENTION

In the following detailed description, numerous specific details are set forth in order to provide a thorough understanding of the invention. However, it will be understood by those of ordinary skill in the art that the present invention may be practiced without these specific details. In other instances, well-known methods, procedures, components and circuits may not have been described in detail so as not to obscure the present invention. It can be appreciated that the specific structural and functional details disclosed herein may be representative and do not necessarily limit the scope of the claimed subject matter.

Some embodiments of the invention include a UV liquid disinfection system and a method of controlling UV disinfection based on salinity levels of the water to be disinfected. The salinity levels of the water to be treated may be measured and then a desired salinity-adjusted UV dose level that should be applied to the water in order to inactivate microorganisms in the water to a desired absolute microbial level may be determined based on pre-determined data that correlates different salinity levels to respective salinity-adjusted UV dose levels. For example, the desired UV dose levels for sea water, brackish water and fresh water may be stored in a memory of the disinfection system and may be used by a processor of the disinfection system to determine a desired salinity-adjusted UV dose level according to the measured salinity level.

In some embodiments, the actual UV dose applied to the water may be monitored on-line and the desired UV dose may be set by adjusting the intensity of UV light emitted from the UV light source, the number of UV sources and/or by changing the flow rate of the treated water. The UV dose applied to the microorganisms is a function of the UV transmittance of the water (UVT), which is a measure of the clarity of the water, the flow rate and the UV lamp power or the number of operated lamps. If the UV transmittance decreases, the UV dose also decreases. If the flow rate decreases, the UV dose increases. If the UV lamp power increases or if an additional UV lamp is activated than the UV dose increases.

The amount of salts in the water, refers herein as salinity, may affect the sensitivity of microorganisms to UV light. Generally, at a higher salinity level, the microorganisms may be more sensitive to UV light and accordingly for a higher salinity level, a lower UV dose level may be sufficient to achieve the same absolute microbial level relative to a lower salinity level. For example, a lower UV dose level may be required to inactivate microorganisms in salty ocean water than UV doses relative to the UV dose level that may be required to inactivate microorganisms in sweeter river water.

It will be appreciated that the water disinfection process may include inactivation or removal of any organism, bacteria, microorganism, being, creature, microbe, germ, virus, organic contaminator, non-organic contaminator, oxidizeable toxic or contaminator; any cumulative noxious species of biological or chemical origin; any oxidizing particle, fragment or element, e.g., Hydrogen peroxide or Titanium dioxide, intended to oxidize a contaminator and/or the like.

A UV disinfection system according to some embodiments of the invention may be located in a watercraft for treating ballast water held in a ballast tank. The ballast water may be pumped from the water surrounding the watercraft and may be treated prior to being inserted to the ballast tank. Further, the ballast water may be treated prior to being discharged from the watercraft to meet international regulations, for example, the IMO regulations as specified in International Convention for the Control and Management of Ships' Ballast Water and Sediments (BWM) or the US regulations of the US Environmental Production Agency (EPA).

The salinity level of the ballast water may vary according to the source of the water. For example, ocean water may have a salinity level higher than 32 PSU, brackish water may have salinity levels of between 3-32 PSU and river water may have a salinity level lower than 3 PSU. PSU is a dimensionless Practical Salinity Scale unit defining the salinity as a conductivity ratio of a water sample to a standard KCl solution. A disinfection system according to embodiments of the invention may be configured to treat both the saltier ocean water and the sweeter brackish or even fresh water in an efficient manner, for example, by changing working parameters of the system (e.g., UV light intensity and/or water flow rate).

Figure 1:
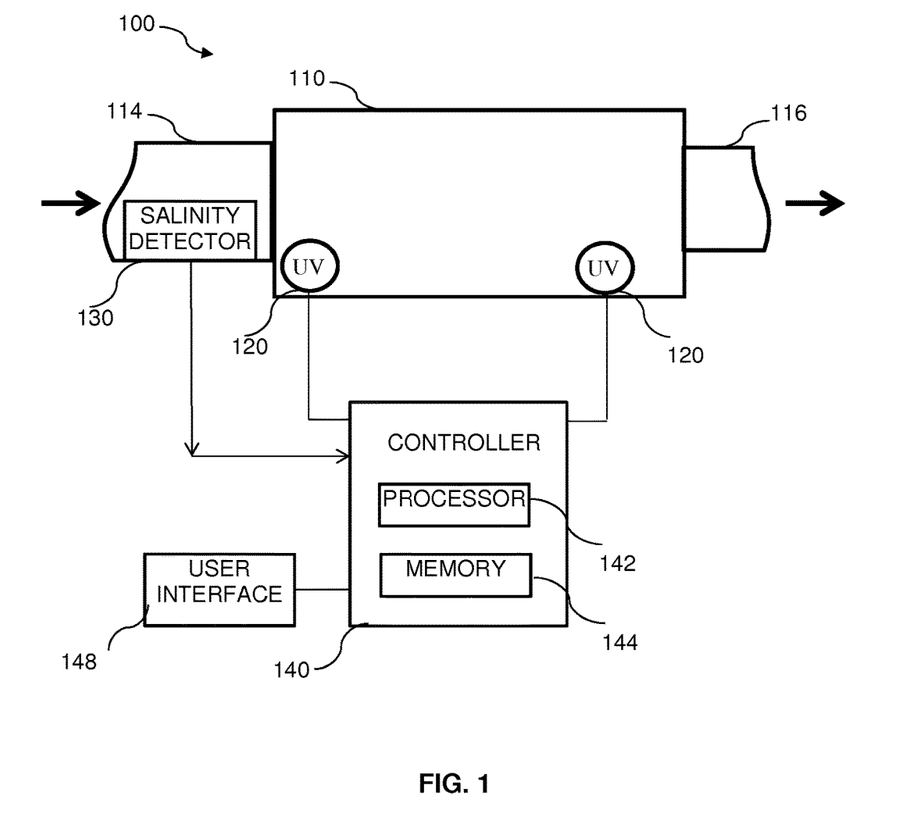
FIG. 1 is a conceptual illustration of an exemplary water disinfection system according to embodiments of the invention.

Reference is now made to FIG. 1, which conceptually illustrates an exemplary disinfection system according to some demonstrative embodiments of the invention. A disinfection system 100 may include a conduit 110 to carry flowing water to be disinfected and at least one UV source 120 to illuminate the water within conduit 110. System 100 may further include at least one salinity detector 130 to detect the salinity levels of the water and a controller 140 to control the UV disinfection process. Although two UV sources are illustrated in FIG. 1, it will be understood by those skilled in the art, however, that the embodiments of the claimed subject matter may be practiced with a different number of UV sources. Although one salinity detector is illustrated in FIG. 1, however, that the embodiments of the claimed subject matter may be practiced with a different number of salinity detector located in other places within the disinfection system.

Conduit 110 may have an inlet 114 to receive the water and an outlet 116 to discharge the water. Conduit 110 may include walls made from any corrosive resisting material. In some embodiments, the walls of conduit 110 may include material that is not corrosion resistant and the walls may be coated with a corrosion resisting coating. In some embodiments, the walls of conduit 110 may, at least partially, include material transparent to UV radiation such as quartz.

One or more UV sources 120 may generate UV light of a suitable UV spectrum. For example, UV source 120 may include one or more UV lamps such as for example low-pressure UV lamps, medium-pressure UV lamps, light emitting diode (LED) UV lamps and/or microwave-excited UV lamps. UV source 120 may generate UV light in the germicidal spectrum in order to inactivate microorganisms in the water. UV source 120 may be immersed in the water flow in conduit 110 (as illustrated) or may be located outside of conduit 110. In the case that UV source 120 is located outside conduit 110, the conduit may include a UV transparent window (not illustrated) and UV source 120 may be located in proximity to the UV transparent window, such that UV light emitted from UV source 120 may enter conduit 110 to disinfect the water flow in conduit 110.

In some embodiments, an array of UV sources may be installed in conduit 110. An exemplary array may include at least two UV transparent sleeves (not illustrated) holding the UV sources 120. In some embodiments, UV sources 120 may be located both inside conduit 110 (e.g., immersed) and outside conduit 110.

Salinity detector 130 may be configured to measure a value indicative of the amount of salt in the water. For example, salinity detector 130 may measure the resistivity of the water and the value indicative of the amount of salt may be a measured resistivity. The resistivity of the water may be measured on-line in real time. In yet another example salinity detector 130 may include a Total Dissolved Solids (TDS) measuring system. The TDS system may include components for evaporating the liquid solvent and measuring the mass of residues left. The TDS method may require several minutes to receive the salinity level. Salinity detector 130 may be located in various places within conduit 110. For example, salinity detector 130 may be located around inlet 114 (as illustrated) or may be located inside conduit 110 (for example, near UV source 120). In some embodiments, more than one salinity detector may be located in conduit 110.

Controller 140 may include a processor 142 and a memory unit 144. Controller 140 may be coupled to a user interface 148. Processor 142 may be, for example, a central processing unit (CPU), a chip or any suitable computing or computational device that may execute instruction or codes stored in memory 144. Codes or instruction stored in memory 144 may include an operating system and instructions to carry out a method of controlling a UV disinfection system according to embodiments of the present invention. Controller 140 may be included in a desktop computer, laptop commuter, a tablet, a mainframe computer or the like. Controller 140 may be configured to receive from salinity detector 130 the measured value and to determine a desired salinity-adjusted UV dose level based on the measured value and data stored in memory 144 that correlates different salinity levels to respective salinity-adjusted UV dose levels.

Controller 140 may be configured to receive data associating different salinity levels with different UV dose levels to be applied to the water. The data may be saved, for example, in a lookup table stored in memory 144. Processor 142 may compare the detected salinity levels to the stored salinity levels and determined the desired salinity adjusted UV dose level. Upon determining the salinity level, an associated UV dose level may be determined. If the detected salinity level is in between two salinity levels stored in the lookup table, an interpolation or any other mathematical manipulation may be performed for determining the UV dose level.

User interface 148 may be connected to controller 140. User interface 148 may include a screen (e.g., a monitor, a display, a CRT, etc.). User interface 148 may be associated with input devices such as, a keyboard, a mouse, a touch screen or a pad or the like. User interface 148 may include an audio device such as one or more speakers, earphones and/or any other suitable audio devices. Controller 140 may further be coupled to salinity detector 130 and UV source 120. Processor 142 may be configured to receive from salinity detector 130 at least one measurement of a value indicative of the salinity level of the water in conduit 110. Processor 142 may further be configured to determine a desired salinity-adjusted UV dose level based on the measured value and to control UV source 120 to apply the desired UV dose level, for example by automatically controlling the intensity of the UV emission (e.g., by controlling the power supply to the UV source).

In some embodiments, controller 140 may be configured to issue an alert to a user, via user interface 148, that the maximum amount of UV dose that can be applied by UV source 120 is lower than the determined desired salinity-adjusted UV dose level. In some embodiments, controller 140 may be configured to adjust the flow parameter, for example decrease the rate of flow of liquid entering the conduit to increase the US dose level to reach the desired salinity-adjusted UV dose level.

In some embodiments, additional detectors may be installed in a system for disinfecting water and the processor may be configured to monitor and control the UV disinfection process and the UV dose level applied to the water and the microorganism in the water. In some embodiments, the system may control the UV dose level applied to the water by controlling the UV light intensity and/or the rate of the water flow in the conduit.

Figure 2:
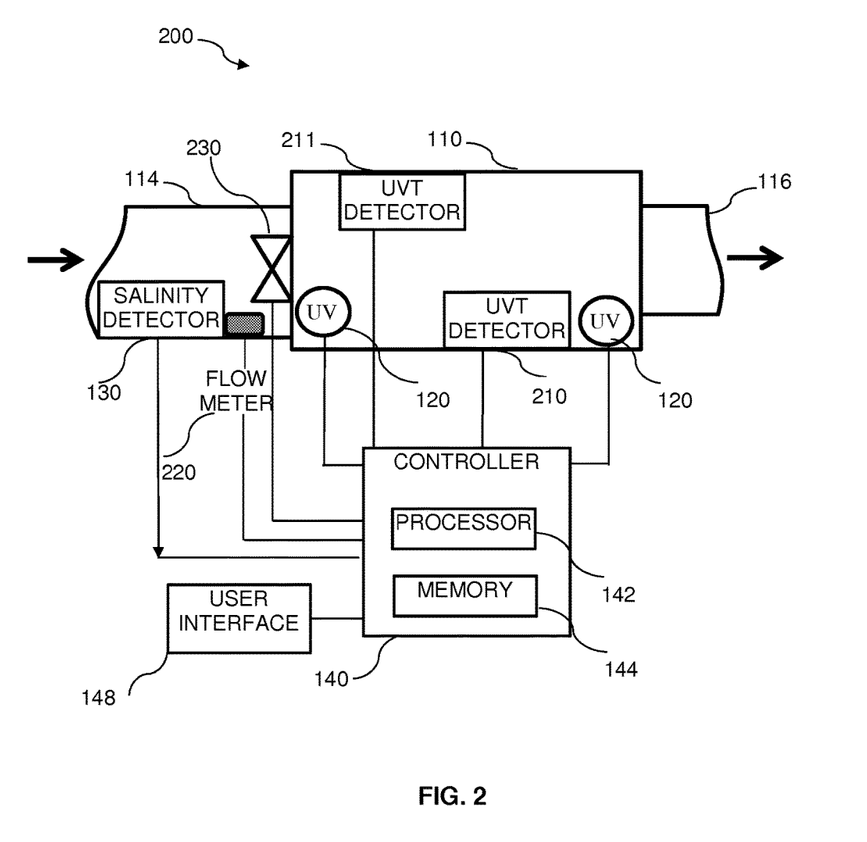
FIG. 2 is a conceptual illustration of another exemplary water disinfection system according to some embodiments of the invention.

Reference is made to FIG. 2 that illustrates an exemplary water disinfection system that includes a UV dose monitoring system according to some embodiments of the invention. A system 200 may include a conduit 110, at least one UV source 120, a salinity detector 130 and a controller 140, that are substantially similar to conduit 110, source 120, detector 130 and device 140 of FIG. 1. System 200 may further include two or more UV water transmission (UVT) detectors 210 and 211 also referred to herein as UV detectors, a flow meter 220 and a valve or a faucet 230, all of which are coupled to controller 140.

UVT detector 210 may be a UV light sensor. The UV light transmittance of the water may be calculated from the measurements of the UV detectors in terms of Ultraviolet Water Transmission (UVT), commonly used in the UV industry and defined as the UV transmittance of a one centimeter water column at 254 nm. In some embodiments, two or more UVT detectors may be located in conduit 110, for example, one UVT detector may be located in proximity to one of UV sources 120, and one UVT detector may be located near outlet 116 or elsewhere in the conduit.

Although the invention is not limited in this respect, UVT detector 210 may include a narrow-band filter centered at a specific wavelength, e.g., 254 nm. For example, a Silicone Photodiode S2684-254 sold by HAMAMATSU, Japan having a sensitivity peak at 254 nm and full width at half maximum (FWHM) of 10 nm may be used. For example, the UVT detector may be a UV sensor according to the German Technical and Scientific Association (DVGW) standards.

Alternatively, instead of internal UV detectors, the system may include an external UVT detection unit having UV sensors and an analyzer, such as, "AccUView OnLine UV % T Analyzer", manufactured by HF Scientific, USA. Such an external unit may receive a sample of the water to be treated and may perform the measurements externally to the conduit of the UV disinfection system. The external unit may then analyze the measurement results and may determine for example the UVT in the conduit. The analysis results may then be sent to controller 140 of the UV disinfection system.

Flow meter 220 may be located at inlet 114 to measure the water flow rate either before or after valve 230. Flow meter 220 may be any commercial flow meter configured to measure a flow of water in a pipe or a conduit. Flow meter 220 may deliver measurements of water flow rates measured by flow meter 220 to processor 142 of controller 140.

Valve of faucet 230 may be any device that is configured to control water flow rate in a pipe or a conduit. Valve 230 may be designed to control ballast water or any other type of water. Valve 230 may be automatically operated or controlled by a processor, for example, processor 142. Valve 230 may include a solenoid and/or electric motor and/or hydraulic or pneumatic pressure that may cause the closure or opening of valve 230 upon receiving an instruction from the processor. Valve 230 may be installed at entrance 114 (as illustrated) to system 200 or at exit 116.

Processor 142 may receive measurements from one or more of salinity detectors 130, UVT detectors 210 and 211 and flow meter 220. Processor 142 may receive a value indicative of the salinity level of the water from salinity detector 130, UVT measurements from UVT detectors 210 and 211 and/or flow rate measurements from flow meter 230. Processor 142 may be configured to determine a desired UV dose level based on measurements of the salinity detector. Instructions of a method of determining the desired UV dose level may be stored on memory 144. Additionally, processor 142 may be configured to cause system 200 to apply the desired UV dose to the water by automatically controlling the intensity of UV source 120 (e.g., controlling the power supplied to the UV source) and/or automatically controlling the water flow rate by controlling valve 230. The UV dose level applied to the water may depend on the intensity of the UV light and the water flow rate.

In some embodiments, controller 140 may receive UV light measurements from UV detectors 210 and 211 and flow measurements from flow meter 230 and may determine the actual UV dose applied to the water based on the real time UVT and flow measurements. The controller may further compare the actual UV dose applied to the water to the desired UV dose and if the desired UV dose is lower than the actual or determined UV dose, the controller may increase the power of UV source 120 and/or slow down the water flow by controlling valve 230. If the controller can no longer control system 200 to increase the UV dose level applied to the water, the controller may issue an alert to a user via user interface 148, that the system cannot properly treat the water.

Different modes of operation may be used. In one mode of operation, a user may preset the UV source power and the flow rate parameters without enabling automatic adjustments of these working parameters. In such a mode, upon receiving the salinity level measurement, the system may determine that the system cannot provide a desired salinity adjusted UV dose level and may issue an alert to the user. In another mode of operation, based on online UVT calculations, the working parameters may be automatically adjusted to match the actual UV dose level with the desired salinity-adjusted UV dose level.

Figure 3:
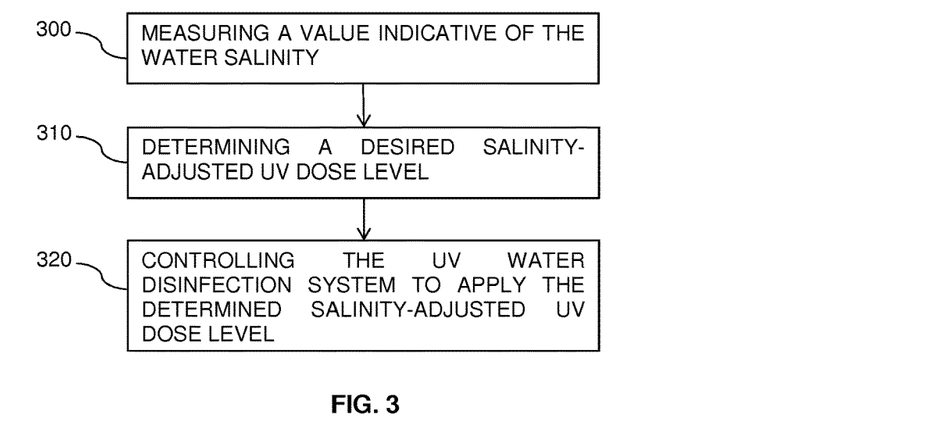
FIG. 3 is a flowchart of a method of controlling UV water disinfection based on salinity levels of the water according to some embodiments of the invention.

Reference is made to FIG. 3 which is a flowchart of a method for controlling UV water disinfection according to some embodiments of the invention.

In operation 300, the method may include measuring a value indicative of the water salinity by using, for example, salinity detector 130. Salinity detector 130 may detect the resistivity of the water. In operation 310, the method may include determining, for example, by processor 142, a desired salinity-adjusted UV dose level based on the measured salinity value. Processor 142 may compare the measured salinity value to salinity values stored in a lookup table in a memory associated with the processor (e.g., memory 144). The lookup table may include a plurality of salinity values, each may be correlated to a salinity-adjusted UV dose level. The salinity-adjusted UV dose level for each salinity value may be determined based on experimental data and/or a computer simulation. If the measured salinity value is in between two stored salinity values extrapolation or any other mathematical method can be used to calculate the desired UV dose level for the measured salinity value.

In operation 320, the method may include controlling, for example, by a processor, the UV water disinfection system to apply the determined UV dose level. Processor 142 may control the power applied to UV source 120 and/or that rate of the water flow via valve 230 (e.g., by controlling an electric motor to open or close valve 230).

In some embodiments, controlling may include issuing an alert to the user via, for example, user interface 148. Each UV disinfection system may have a maximal UV dose that the system can apply to the water in a given system. The maximal UV dose may be applied when the system is configured to apply maximal power to UV source 120 and/or minimal flow rate in valve 230. In the case that the desired salinity-adjusted UV dose is below the maximal UV dose level of the system, the method may include issuing an alert to the user, that the system cannot supply the desired salinity-adjusted UV dose level.

Figure 4:
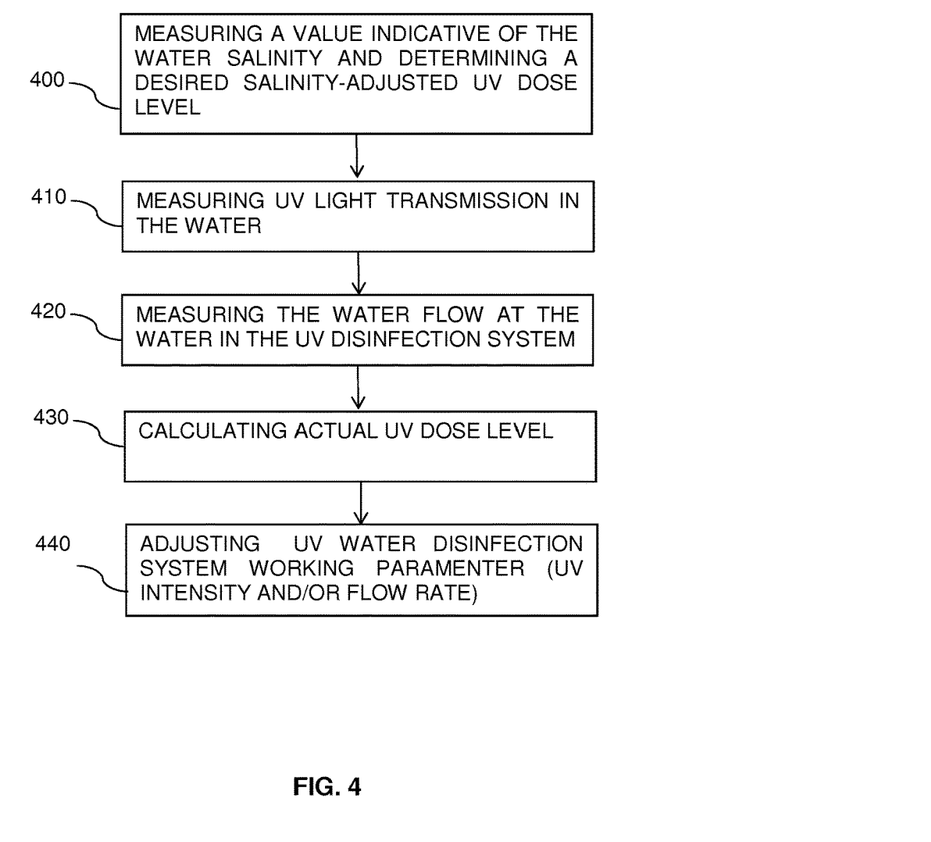
FIG. 4 is a flowchart of a method of controlling UV water disinfection according to some embodiments of the invention.

In some embodiments, the system may include UV light monitoring system that is configured to perform UV water transmission (UVT) calculation in real-time. A flowchart of a method of controlling UV water disinfection based on salinity levels, water flow and UVT measurements according to some embodiments of the invention is illustrated in FIG. 4.

In operation 400, the method may include measuring a value indicative of the water salinity, by using, for example, salinity detector 130 and determining a desired salinity-adjusted UV dose level based on the measured salinity value and predetermined data correlating salinity levels to respective UV dose levels. Salinity detector 130 may detect the resistivity of the water. According to some embodiments of the invention, salinity detector 130 may detect a voltage signal which may be delivered to processor 142 for processing, for example, by a software tool stored in memory 144. For example, detected voltage signals may be translated by a signal processing software tool to weighted average transmission values. Processor 142 may execute codes stored on memory 144 for determining a UV dose level. For example, processor 142 may determine the UV dose levels based on lookup tables stored in a memory associated with the processor (e.g., memory 144)

In operation 410, the method may include measuring UV light transmission in the water using two or more UV light detectors (e.g., UVT detector 210 and 211). For example, a first UV detector may measure the UV light received directly from a UV source without traversing the water and another UV detector may measure the UV light received from the UV source after traversing a known distance in the water. The UVT may be calculated based on the two measurements. Alternatively, a first UV detector may measure the UV light received from a UV source after traversing a known distance in the water and another UV detector may measure the UV light received from the UV source after traversing a different distance in the water. The UVT may be calculated from measurements of two UV detectors that are located at different distances from the UV light source. According to some embodiments of the invention, processor 142 may receive measurement results from the UV detectors in real-time during the disinfection operation and may calculate the UVT values.

In operation 420, the method may include measuring the water flow rate of the water in the UV disinfection system using a flow meter (e.g., flow meter 220). The water flow may be measured at the inlet of a conduit included in the UV disinfection system, for example, inlet 114 in conduit 110. In operation 430, the method may include calculating the actual UV dose level in the water based on the UVT calculations and the detected flow rate.

In operation 440, the method may include adjusting the UV disinfection working parameters such as UV intensity and water flow rate to control, for example, by processor 142, the UV water disinfection system so as to apply the determined UV dose level. Processor 142 may control the power applied by UV source 120 and/or that rate of the water flow via valve 230. In some embodiments, monitoring in real time the UVT measurements may allow controller 140 to detect the actual UV dose level that are applied to the water and to further compare the detected UV does levels to the determined desired UV dose levels. If the detected UV dose levels are lower than the desired UV dose levels, the controller may increase the power to UV source 120 (or ignite additional array of lamps) and/or decrease the water flow rate in valve 230. If the controller can no longer increase the UV dose levels in system 200, the method may include issuing an alert to the user (e.g., via user interface 148) that the desired UV dose levels cannot be applied to the water.

Figure 5:
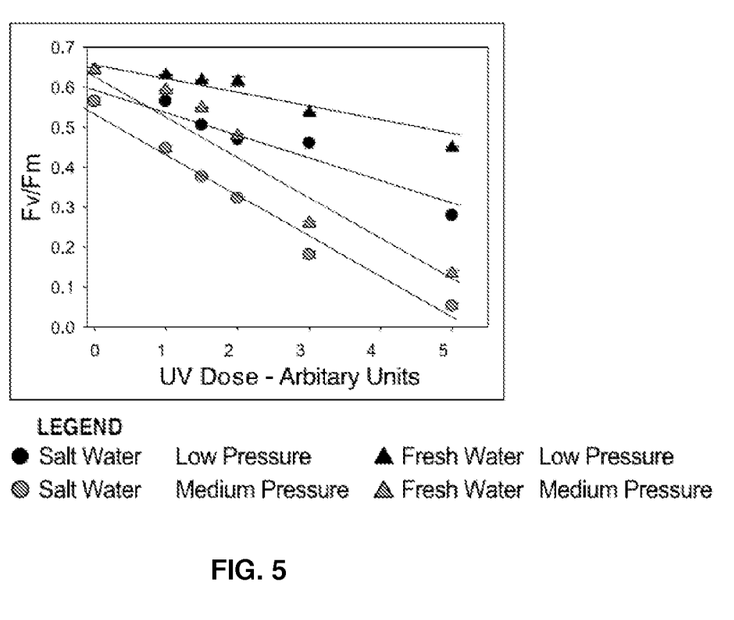
FIG. 5 is a diagram showing measurements of microorganism viability in salty and fresh water after exposure to UV light helpful in understanding embodiments of the invention.

Reference is made to FIG. 5 that shows results of a photosynthetic efficiency (Fm/Fv) of phytoplankton after exposure to UV light at different UV doses. The photosynthetic efficiency is a measurement for the viability of the microorganism left in the water. Two types of UV lamps, a low pressure UV lamp and a medium pressure UV lamp were used. The influence of the UV radiation on phytoplankton was measured using 10 liter samples of filtered natural water. The salty water sample was taken from a coastal area in the North Sea (Wadden Sea in Germany) and the fresh water sample was taken from the Waal River in Germany. The photosynthetic efficiencies measured for various UV doses in fresh water are marked in triangles and for salty water are marked in circles. The UV does level are given in arbitrary units and a higher value represents a higher UV dose level. Results obtained during UV illumination with a low pressure lamp are marked in black circles or triangles and results obtained during UV illumination with a medium pressure lamp are marked in grey circles or triangles. The higher the amount of salt in the water at a given lamp and a given UV dose the lower is the photosynthetic efficiency and the lower is the viability of the microorganism. It is also shown that medium pressure lamps can inactivate phytoplamkton more efficiently than low-pressure lamps.

While certain features of the invention have been illustrated and described herein, many modifications, substitutions, changes, and equivalents may occur to those of ordinary skill in the art. It is, therefore, to be understood that the appended claims are intended to cover all such modifications and changes as fall within the true spirit of the invention.

What is claimed is:

1. An ultraviolet (UV) liquid disinfection system comprising:
   a conduit to carry liquid to be disinfected, the conduit having an inlet to receive the liquid and an outlet to discharge the liquid;

a UV source configured to illuminate the liquid within the conduit;

a liquid salinity detector to measure a value indicative of a salinity level of the liquid within the conduit of the UV liquid disinfection system;

a memory that stores data correlating different liquid salinity levels to respective salinity-adjusted UV dose levels, wherein correlation of the salinity levels to the UV dose level is based on sensitivity of microorganisms to UV light at the different liquid salinity levels; and a controller coupled to the liquid salinity detector and the UV source, the controller being configured to receive from the liquid salinity detector the measured value and to determine a desired salinity-adjusted UV dose level based on the measured value and the data stored in the memory correlating the liquid salinity levels to the respective salinity-adjusted UV dose levels.

2. The UV liquid disinfection system of claim 1, wherein the UV liquid disinfection system is coupled to a watercraft ballast tank and configured to treat ballast water.

3. The UV liquid disinfection system of claim 1, wherein the controller is configured to automatically adjust an intensity of the UV source to ensure delivery of the desired salinity-adjusted UV dose level.

4. The UV liquid disinfection system of claim 1, wherein the controller is configured to issue an alert if the desired salinity-adjusted UV dose level is above a predetermined value, which is determined based on a maximum amount of UV dose that can be applied by the UV source.

5. The UV liquid disinfection system of claim 1, further comprising:

two UV detectors to detect light emitted from the UV source; and a flow meter to detect flow rate of the liquid, wherein the controller is further configured to receive UV-detected measurement values from the UV detectors, to calculate UV transmission of the liquid (UVT) based on the UV-detected measurement values and to calculate on-line an actual UV dose level based on the UV transmission of the liquid and the flow rate of the liquid.

6. The UV liquid disinfection system of claim 5, wherein the controller is configured to issue an alert if the actual UV dose level is lower than the desired salinity-adjusted UV dose level.

7. The UV liquid disinfection system of claim 5, wherein the controller is configured to automatically adjust an intensity of the UV source based on the actual UV dose level.

8. The UV liquid disinfection system of claim 5, wherein the controller is configured to automatically adjust the flow rate of liquid entering the conduit based on the detected UV dose level.

9. The UV liquid disinfection system of claim 1, wherein the controller is further configured to receive UVT calculations from an external online UVT detection unit.

10. The UV liquid disinfection system of claim 1, wherein the salinity detector is configured to measure electrical resistance of the liquid.

11. A method comprising:

flowing liquid to be treated through a conduit of an ultraviolet (UV) liquid disinfection system, the conduit having an inlet to receive the liquid and an outlet to discharge the liquid;

storing data correlating liquid salinity levels to respective salinity-adjusted UV dose levels, wherein correlating the salinity levels to the UV dose level is based on sensitivity of microorganisms to UV light at the different liquid salinity levels;

measuring a value indicative of a salinity level of the liquid within the conduit of the UV liquid disinfection system;

determining a desired salinity-adjusted UV dose level to be applied to the liquid in the conduit based on the measured value and and the data stored in the memory correlating the liquid salinity levels to the respective salinity-adjusted UV dose levels; and controlling the UV liquid disinfection system to apply the desired salinity-adjusted UV dose level to the liquid within the conduit.

12. The method of claim 11, wherein controlling comprises controlling an intensity of a UV source illuminating the water.

13. The method of claim 11, wherein controlling comprises controlling flow rate of the water in the conduit.

14. The method of claim 11, further comprising:

monitoring online UV light transmission in the liquid;

measuring flow rate of the liquid in the conduit;

determining, by a processor, an actual UV dose level applied to the liquid; and automatically adjusting an intensity of a UV source illuminating the liquid to ensure delivery of the desired salinity-adjusted UV dose level.

15. The method of claim 14, comprising:

issuing an alert if the desired salinity-adjusted UV dose level is above a predetermined value, which is determined based on a maximum amount of UV dose that can be applied by the UV source.

\* \* \* \* \*